(12) United States Patent
Bohn

(10) Patent No.: US 6,242,731 B1
(45) Date of Patent: Jun. 5, 2001

(54) IMAGING DEVICE HAVING AN INTEGRATED POSITION SENSING DEVICE

(75) Inventor: David D. Bohn, Fort Collins, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/343,641

(22) Filed: Jun. 30, 1999

(51) Int. Cl.[7] .................................................. H01L 27/00
(52) U.S. Cl. .................. 250/208.1; 250/216; 250/559.44
(58) Field of Search ............................... 250/208.1, 566, 250/216, 559.4, 559.44, 556, 235; 235/462.45, 472.01; 382/313

(56) References Cited

U.S. PATENT DOCUMENTS

| | | | |
|---|---|---|---|
| 4,125,860 | * 11/1978 | Ishii et al. | 358/128 |
| 5,578,813 | 11/1996 | Allen et al. | 250/208.1 |
| 5,644,139 | 7/1997 | Allen et al. | 250/557 |

* cited by examiner

Primary Examiner—Que T. Le

(57) ABSTRACT

An imaging device is disclosed wherein light used to image an object (imaging light) and light used to determine the position of the imaging device relative to the object (positioning light) pass through the same optical device. Imaging light is directed from an imaging portion of the object to a linear photosensor array. Positioning light is directed from a positioning portion of the object to a two-dimensional photosensor array. In one embodiment of the imaging device, the imaging light and positioning light have different wavelengths and are directed to their respective locations by the use of a beam splitter. In another embodiment of the invention, the imaging light and positioning light are directed to their respective locations by diffracting the light with a lens.

28 Claims, 5 Drawing Sheets

IMAGING DEVICE HAVING AN INTEGRATED POSITION SENSING DEVICE

FIELD OF THE INVENTION

The present invention relates to position sensing devices and, more particularly, to a scanning device having a position sensing device integrated into the imaging portion of the scanning device.

BACKGROUND OF THE INVENTION

Hand-held scanning devices are portable imaging devices that generate machine-readable image data (sometimes referred to herein simply as image data) representing an image of an object. Generating image data representative of an object is sometimes referred to as "imaging" or "scanning" the object. Some scanning devices generate image data representing a narrow "scan line" portion of the object being imaged. During the imaging process, the scanning device is moved relative to the object being imaged. As the scanning device is moved relative to the object, the scanning device generates image data representing a plurality of sequential scan line portions of the image of the object. The image of the object is, accordingly, represented by the image data of the cumulation of sequential scan lines similar to the image of the object represented by a conventional video display.

The image of the scan line portion of the object is focused onto a linear array of photodetector elements (sometimes referred to herein simply as photodetectors). The photodetectors may, as an example, be mounted to a plurality of linearly arranged electronic segments such as contact image sensors as are known in the art. The photodetectors may also be etched into a single semiconductor as is common in a charge-coupled device. The individual photodetectors generate image data representing discrete portions of the image of the scan line portion of the object. The image data may, as an example, be voltages wherein a relatively high voltage represents a relatively high intensity of light received by a photodetector and a relatively low voltage represents a relatively low light intensity received by a photodetector.

The image data generated by the photodetectors is transmitted to a processor. One of the functions of the processor is to create a data base or similar electronic structure that indicates the positions of the scan lines relative to the positions on the object from where the scan lines were generated. Alternatively, the data base may indicate the locations of the scan lines relative to each other. The data stored in the data base and the image data are used by the processor to replicate the image of the object. As an example, in the situation where the scanning device is generating image data representing a two-dimensional object, such as text located on a sheet of paper, the hand-held scanning device may be moved in any direction on the paper. Accordingly, the scan line portions may be generated from virtually any location on the paper, which leads to the image data representing the image of the object consisting of a plurality of scan line portions that may be skewed over the surface of the object. In order to accurately replicate the image of the object, the hand held scanning device uses the data stored in the data base to determine the proper placement of the scan line portions of the image of the object. The processor may then create an electronic image of the object by known processing techniques, e.g., stitching software.

A problem replicating the image of the object may be encountered if the velocity or position of the scanning device relative to the object becomes unknown during the scanning process. For example, if the scanning device is imaging one thousand scan line portions of the image of the object per second and the scanning device is moving along a single axis at a constant rate of one inch per second relative to the object, each scan line represents one one-thousandth of an inch of the image of the object. If the correct velocity of the scanning device relative to the object has been conveyed to the processor, the processor will create a data base indicating that each scan line represents one one-thousandth of and inch of the image of the object. Alternatively, the processor will indicate that each scan line is located one one-thousandth of an inch from an adjacent scan line. Based on the image data and the data stored in the data base, the processor may accurately replicate the image of the object. If, however, the velocity of the scanning device relative to the object is decreased and the decreased velocity is not conveyed to the processor, the processor will continue to process the image data as though each scan line represents one one-thousandth of an inch of the object. Each scan line, however, will represent less than one one-thousandth of an inch of the object. Accordingly, the image of the object will be compressed. If, on the other hand, the velocity of the scanning device relative to the object is increased and the increased velocity is not conveyed to the processor, the image of the object will be expanded.

Accurately replicating an image of an object when either the velocity or position of the scanning device relative to the object becomes unknown is impossible. If the position or velocity is not known, the processor will not know where the scanning device is located relative to the object as the scan lines are being generated. Accordingly, the processor will not be able to properly place the scan line portions relative to each other so as to accurately replicate the image of the object. This problem is exacerbated in hand-held scanning devices where the scan lines may be generated from anywhere on the object and are often skewed over the surface of the object.

In order to overcome these problems, scanning devices use position sensors to detect the position of the scanning device relative to the object. The position sensors output position information pertaining to the position of the scanning device relative to the object as the scan line portions of the image of the object are being generated. This position information is conveyed to the processor where it is incorporated into the above-described data base.

Some scanning devices use roller mechanisms to generate information pertaining to the position of the scanning device relative to the object. This position information is processed to determine where, in relation to the surface of the object, the scan lines were generated. The roller mechanism contacts the object and rotates as the scanning device is moved relative to the object. The scanning device measures the rotation of the roller mechanism to determine the position of the scanning device relative to the object. Roller mechanisms, however, do not provide a direct measurement of the position of the scanning device relative to the object. Instead, the position measurement is derived from the rotation of the roller mechanism, which may add inaccuracies to the position measurement. Furthermore, the roller mechanism relies on friction between the roller mechanism and the object in order to maintain rotation. If the friction is decreased for any reason, the roller mechanism may slip rather than rotate, which will cause the position measurement and, accordingly, the image represented by the image data to be inaccurate.

The roller mechanisms need to contact the object so that they do not interfere with the scanning device as it is generating image data. The roller mechanisms, thus, increase the size of the scanning device beyond the size required to generate image data. This increased size is detrimental to hand-held scanners, because it makes them more cumbersome to use.

Other scanning devices have an optical sensor affixed to the scanning device to determine the position of the scanning device relative to the object being scanned. The optical sensor periodically generates image data from a small two-dimensional area of the object being scanned. A processor receives this image data and identifies distinct features on the object. In the example where the object is text printed on a sheet of paper, the distinct features may be inherent irregularities in the surface of the paper. The positions of these distinct features relative to the optical sensor are stored in a memory device. As the scanning device is moved relative to the object, the positions of these distinct features move relative to the optical sensor. The processor compares the new positions of these distinct features to the positions stored in the memory device. Based on these comparisons, the processor is able to determine the position, direction of movement, and velocity of the scanning device to which the optical sensor is affixed relative to the object. Accordingly, the processor is able to create the above-described data base because the locations of the scan line portions of the image of the object relative to each other may be readily determined.

Some scanning devices may have several of these two-dimensional optical sensors located at fixed locations relative to the linear array of photodetectors. In some scanning devices, an optical sensor is spaced a distance from each end of the linear array of photodetectors. These locations of the optical sensors present problems when a user operates the scanning device in the vicinity of the edge of the object, i.e., the user images text near the edge of a sheet of paper. As the linear array of photodetectors images the edge of the paper, the optical sensor nearest the edge of the paper may inadvertently be moved off the paper and onto another surface that supports the paper, e.g., a desk top. If the optical sensor is unable to detect distinct features on the other surface or if the paper moves relative to the other surface, the processor will not know the position of the scanning device relative to the paper. Accordingly, the text on the paper will not be able to be replicated by the processor. This placement of the optical sensors has another disadvantage because it increases the length of the scanning device by the distance the optical sensors are spaced from each end of the linear array of photodetectors. This increased length of the scanning device is inherently detrimental to a hand-held scanning device.

Some other scanning devices space the optical sensors a distance above or below the linear array of photodetectors. This location of the optical sensors causes the width of the hand-held scanning device to be increased, which, as with the increased length of a hand-held scanning device, is inherently detrimental. The wider hand-held scanning device also presents a problem because a user may not know where on the object the scan line portions are being generated. As an example, a user scanning a page of text may not properly position the scanning device relative to the text and may inadvertently not image a portion of the text. An additional problem, as described above, may be encountered if the optical sensors are moved off the page and onto another surface. As with the above-described scanning device, the optical sensors may not be able to detect distinct features on this surface, which will cause errors when the image data is processed. Specifically, the positions of the scan lines will not be accurately determined, which will cause errors when the processor attempts to replicate the image of the page.

Therefore, a need exists for a hand-held scanning device that is able to directly determine its position relative to an object being imaged wherein the size of the scanning device is minimized.

SUMMARY OF THE INVENTION

An imaging device is disclosed wherein light used to image an object (imaging light) and light used to determine the position of the imaging device relative to the object (positioning light) pass through the same optical device. Imaging light is directed from an imaging portion of the object to a linear photosensor array. Positioning light is directed from a positioning portion of the object to a two-dimensional photosensor array. In one embodiment of the imaging device, the imaging light and positioning light have different wavelengths and are directed to their respective locations by the use of a beam splitter. In another embodiment of the invention, the imaging light and positioning light are directed to their respective locations by diffracting the light with a lens. Passing imaging light and positioning light through the same optical device allows the imaging device to use fewer optical components than a conventional imaging device. It also allows the imaging portion of the object and the positioning portion of the object to be located in close proximity, which reduces the size of the imaging device.

DETAILED DESCRIPTION OF THE INVENTION

Figure 1:
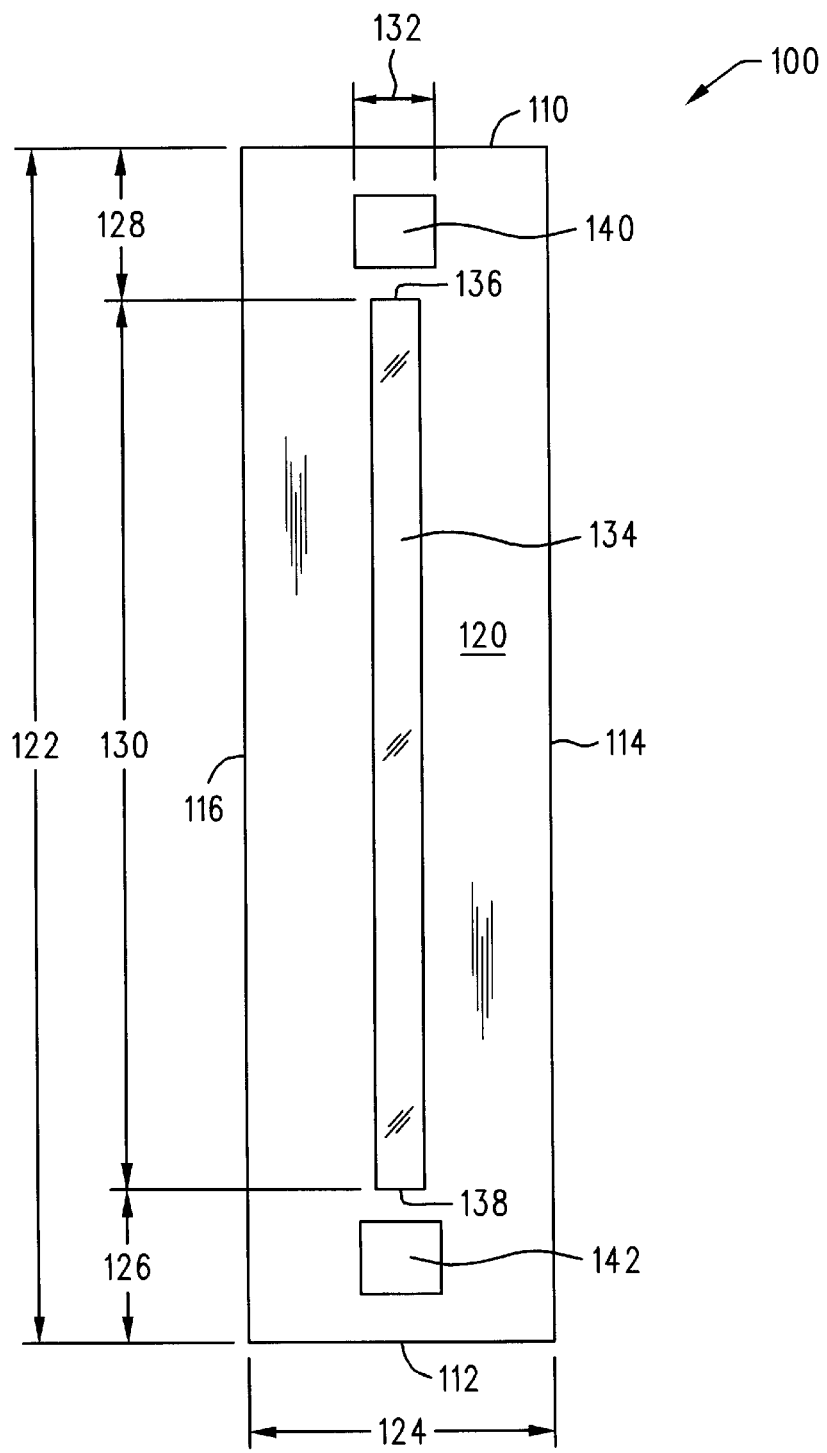
FIG. 1 schematic illustration of a bottom view of a prior scanner.

FIGS. 2 through 5, in general, illustrate an imaging apparatus 300, 500 comprising: a first light path 360, 370 extending between a focal axis 366 and a linear imaging device 460, wherein the first light path 360, 370 intersects a first optical component 340; a second light path 380, 390 extending between a focal plane 262 that is located proximate to the focal axis 366 and a two-dimensional imaging device 420, wherein the second light path 380, 390 intersects the first optical component 340; and wherein a portion of the first light path 360, 370 intersects a portion of the second light path 380, 390.

FIGS. 2 through 5 also, in general, illustrate a method of imaging an object 212 comprising: illuminating an axis portion 366 of the object 212; illuminating an area portion 262 of the object 212, wherein the area portion 262 of the object 212 is located proximate to the axis portion 366 of the object 212; directing light 360 reflected from the axis portion 366 of the object 212 to a linear imaging device 460 with a first optical component 340, 350; directing light 380 reflected from the area portion 262 of the object 212 to a two-dimensional imaging device 420 with the first optical component 340, 350; causing relative movement between the object 212 and the first optical device 340, 350; generating first image data of the axis portion 366 of the object 212 with the linear imaging device 460; generating second image data of the area portion 262 of the object 212 with the two-dimensional imaging device 420; performing a first analysis on the second image data to identify features of the object 212; and performing a second analysis on the second image data to determine the locations of the features relative to the two-dimensional imaging device 420 as the object 212 moves relative to the first optical device 340, 350.

FIGS. 2 through 5 also, in general, illustrate a method of imaging an object 212 comprising: illuminating an axis portion 366 of the object 212 with a first frequency band of light 320; illuminating an area portion 262 of the object 212 with a second frequency band of light 322 wherein the area portion 262 of the object 212 is proximately located to the axis portion 366 of the object 212; directing light 360 reflected from the axis portion 366 of the object 212 to a linear imaging device 460 with a first optical component 340, 350; directing light 380 reflected from the area portion 262 of the object 212 to a two-dimensional imaging device 420 with the first optical component 340, 350; causing relative movement between the object 212 and the first optical component 340, 350; generating first image data of the axis portion 366 of the object 212 with the linear imaging device 460; generating second image data of the area portion 262 of the object 212 with the two-dimensional imaging device 420; performing a first analysis on the second image data to identify features of the object 212; and performing a second analysis on the second image data to determine the locations of the features relative to the two-dimensional imaging device 420 as the object 212 moves relative to the first optical device 340, 350.

FIGS. 2 through 5 also, in general, illustrate an imaging apparatus 300, 500 comprising: a first illumination means 314 for illuminating an axis portion 366 of an object 212; a second illumination means 316 for illuminating an area portion 262 of the object 212 wherein the area portion 262 is located proximate to the axis portion 366 of the object 212; a light directing means 340, 350 for directing light 360 reflected from the axis portion 366 of the object 212 to a linear imaging device 460 and for directing light 380 reflected from the area portion 262 of the object 212 to a two-dimensional imaging device 420; a first processing means for processing data generated by the linear imaging device 460; a second processing means for identifying and locating features in the area portion 366 of the object 212.

Having described the imaging system 300, 500, FIGS. 2–5, in general, it will now be described in greater detail being used in a hand-held imaging device 200, FIG. 2 (sometimes referred to herein simply as the scanner 200). The following description summarily describes conventional scanners, followed by a summary description of the scanner 200 incorporating the imaging system 300, 500 and concludes with a more detailed description of the imaging system 300, 500. It is to be understood, however, that the use of the imaging system 300, 500 in a scanner is for illustration purposes and that the imaging system 300, 500 may be used in other devices, e.g., facsimile machines.

Scanners are devices that generate machine-readable image data (sometimes referred to herein simply as image data) representative of an image of an object, such as text printed on a sheet of paper. Generating image data representing the image of an object is often referred to as imaging or scanning the object. An example of a hand-held scanner 200 is illustrated in FIG. 2 scanning the surface 212 of a sheet of paper 210.

Figure 2:
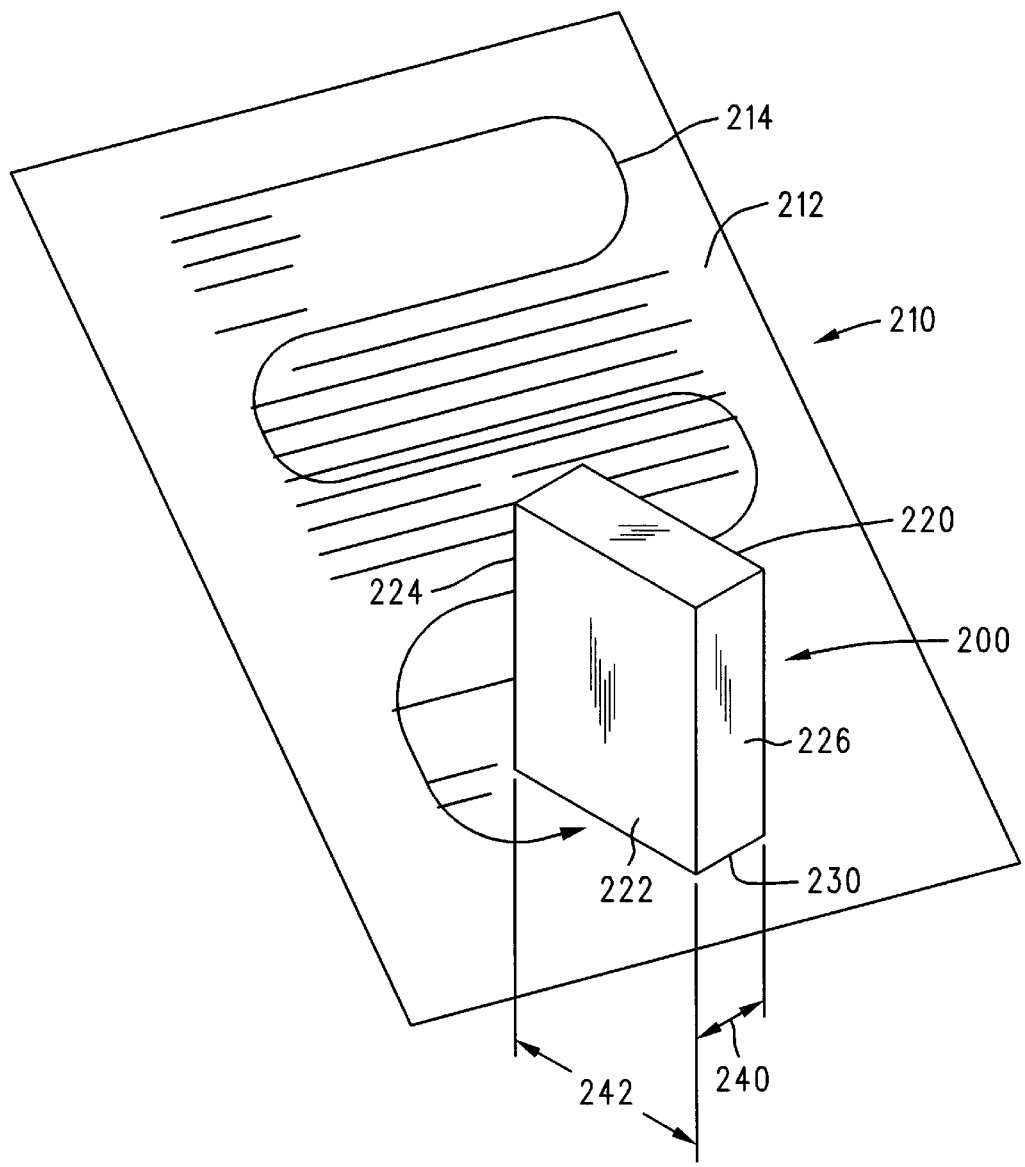
FIG. 2 is a top perspective view of a scanner associated with a sheet of paper.
Figure 3:
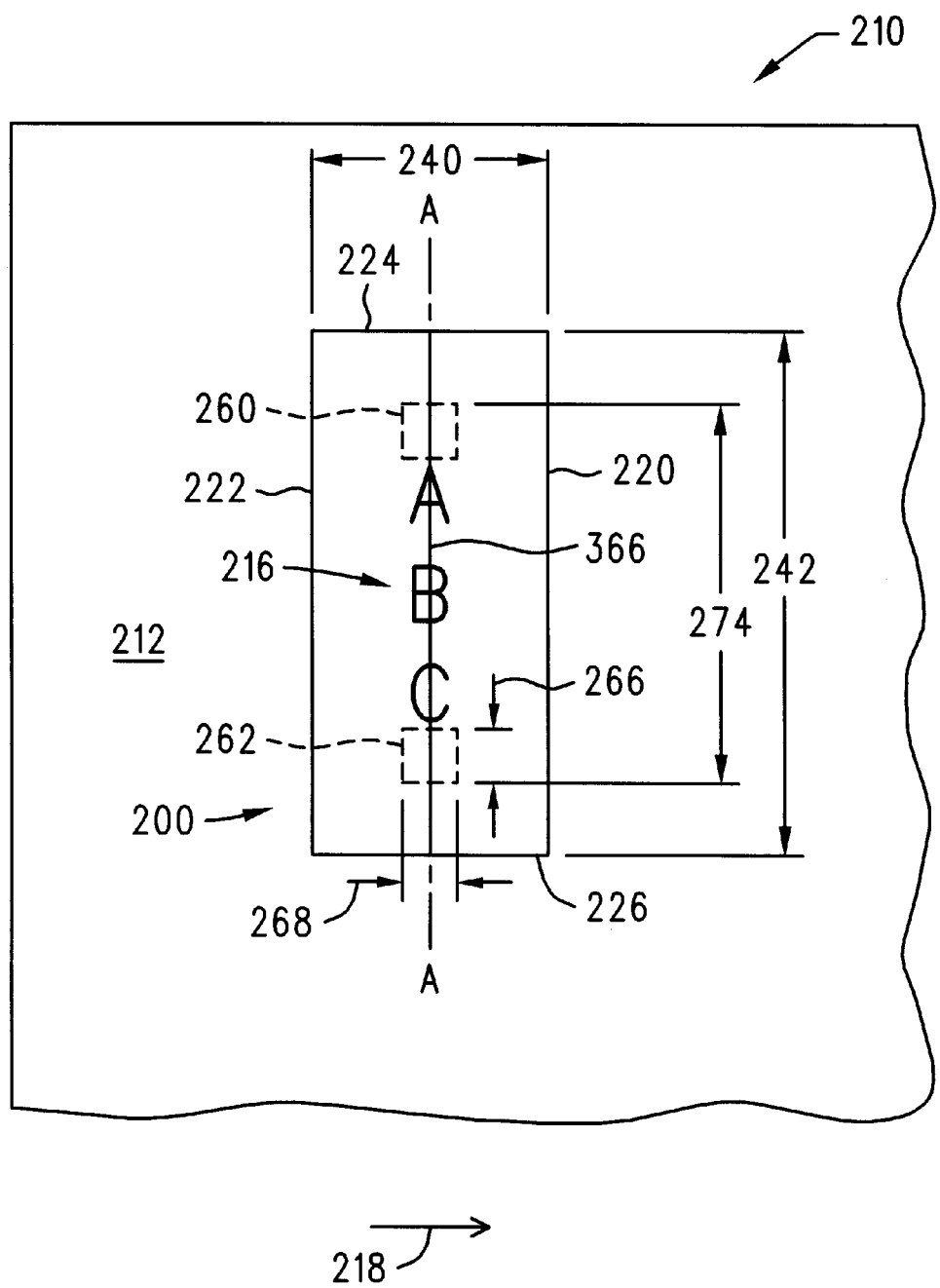
FIG. 3 is a top cut away view of the scanner of FIG. 2.

FIG. 3 is a cut away top view of the scanner 200 illustrated in FIG. 2. The scanner 200 is illustrated imaging text 216 printed on the surface 212 of the sheet of paper 210. The scanner 200 generates image data representing a narrow scan line portion 366 of the surface 212 wherein the location of the scan line portion 366 is fixed relative to the scanner 200. A user may cause relative movement between the scanner 200 and the surface 212. As the scanner 200 moves relative to the surface 212, the scanner generates image data representative of a plurality of successive scan line portions 366 of the surface 212. The image data representing these successive scan line portions 366 of the surface 212 may be stored in a conventional data storage device for future processing. The scanner 200 may process the stored image data to replicate the image of the surface 216 or to transmit an image of the surface 212 to a computer.

As an example, when the scanner 200 is located above the text 216 as illustrated in FIG. 3, the scan line portion 366 will include the text 216. As the scanner 200 is moved in a direction 218, the scanner 200 will generate image data of successive scan line portions of the surface 212, including the text 216. When the scanner 200 has passed over the text 216, the scanner 200 will have image data stored in a data storage device that may be processed to replicate the image of the text 216.

It is critical for processing purposes that the locations of the scan line portions 366 relative to the surface 212 or relative to each other be known. Otherwise, the scanner 200 will have image data representing a plurality of scan line portions 366 of the surface 212, but the scanner 200 will not be able to properly place the scan line portions 366 relative to each other to replicate the image of the surface 212. This problem is exacerbated when the scanner 200 is a hand-held scanner because the user provided movement typically causes the scan line portions 366 to be skewed over the surface 212.

An example of a prior solution for determining the locations of the scan line portions is illustrated by the bottom schematic illustration of the scanner 100 in FIG. 1. The scanner 100 has a left portion 110, a right portion 112, a front portion 114, and a rear portion 116. A length 122 extends between the left portion 110 and the right portion 112. A width 124 extends between the front portion 114 and the rear portion 116. The scanner 100 has a bottom surface 120 defined by the length 122 and the width 124.

The bottom surface 120 of the scanner 100 has a first positioning portion 140, a second positioning portion 142, and an imaging portion 134. The imaging portion 134 serves to generate image data of a one-dimensional scan line portion of the object being scanned in a conventional manner. The imaging portion 134 has a first end 136 and a second end 138. A length 130 extends between the first end 136 and the second end 138. The first end 136 of the imaging portion 134 is located a distance 128 from the left portion 110 of the scanner 100. The second end 138 of the imaging portion 134 is located a distance 126 from the right portion 112 of the scanner 100. The first positioning portion 140 is located between the first end 136 of the imaging portion 134 and the left portion 110. The second positioning portion 142 is located between the second end 138 of the imaging portion 134 and the right portion 112.

The first positioning portion 140 and second positioning portion 142 are used by the scanner 100 to determine the location of the scanner 100 relative to the object being scanned. The first positioning portion 140 and second positioning portion 142 are two-dimensional imaging devices that generate image data representing features of the object being scanned. They may, as an example, generate image data representing small variations in the surface of the object being scanned. In the situation where a sheet of paper is being scanned, the first positioning portions 140, 142 may generate image data representing shadows cast by surface variations in the sheet of paper. Based on this image data, the scanner 100 is able to determine the positions of the scan lines generated by the imaging portion 134 relative to each other. The scanner may then readily replicate the image of the object. Examples of using position sensors to determine the position of a scanner are disclosed in the following U.S. Pat. No. 5,644,139 of Allen et al. for NAVIGATION TECHNIQUE FOR DETECTING MOVEMENT OF NAVIGATION SENSORS RELATIVE TO AN OBJECT; and U.S. Pat. No. 5,578,813 of Allen et al. for FREEHAND IMAGE SCANNING DEVICE WHICH COMPENSATES FOR NON-LINEAR MOVEMENT, which are both hereby incorporated by reference for all that is disclosed therein.

One of the objectives in the design of hand-held scanners is to minimize their size, which in turn, makes them easier to use because they are less cumbersome. The length 122 of the scanner 100 is longer than the length 130 of the imaging portion 134 by the distance 126 and the distance 128. The length 122 is excessively long because it includes the positioning portions 140, 142 and the imaging portion 134, which are all separate units that are required to occupy area on the surface 120 of the scanner 100.

Referring to FIG. 3, the scanner 200 minimizes its length 242 and, thus, its size, by incorporating its positioning portions 260, 262 into the imaging portion as will be described in greater detail below. Accordingly, the scanner 200 may only need to have a length 242 that is approximately as long as the length of the scan line 366. The length of the scan line 366 may be slightly smaller than the length 242 of the scanner 200 for structural reasons, i.e., supporting the components associated with the scan line 366.

Figure 4:
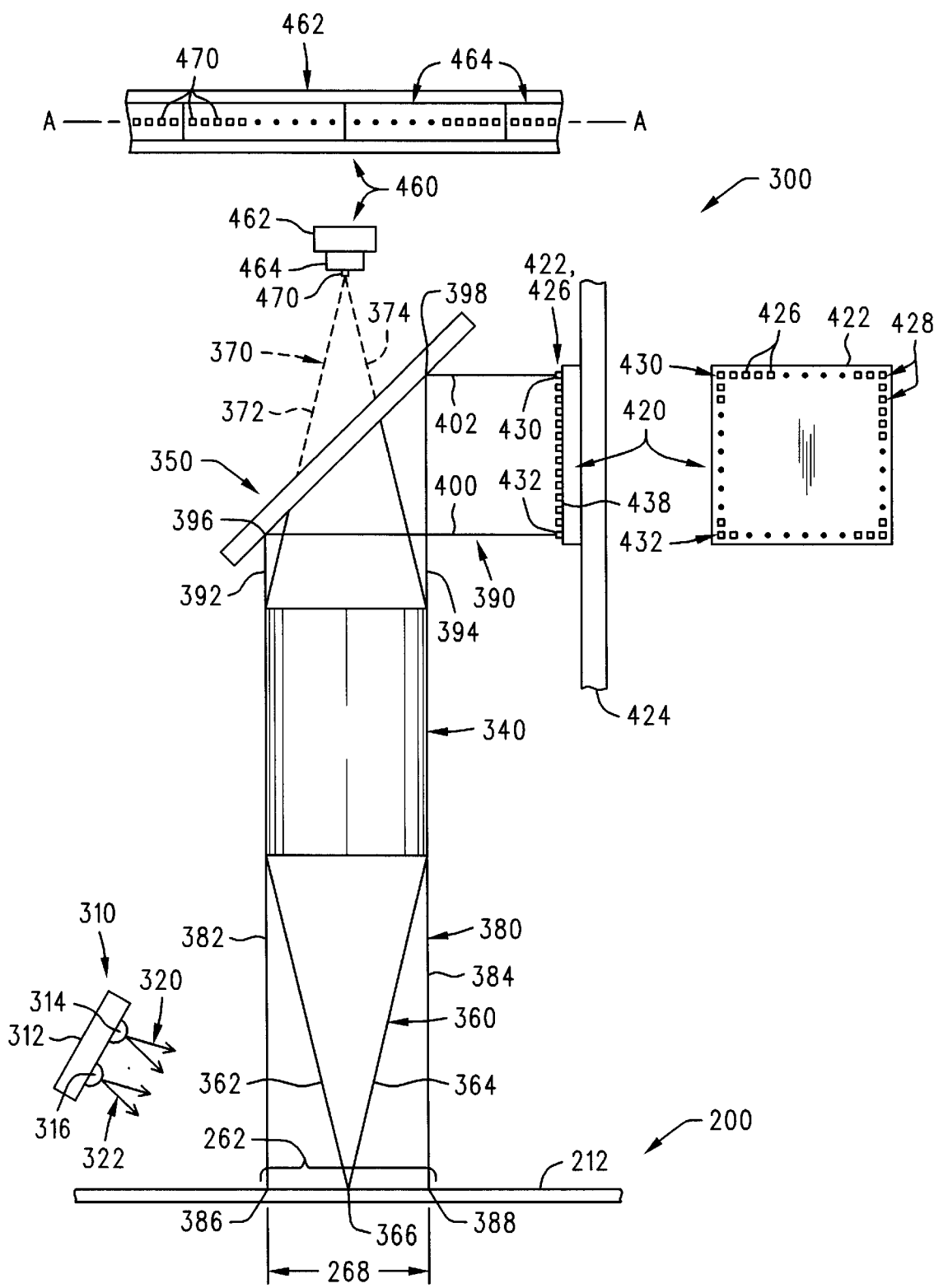
FIG. 4 is a schematic illustration of an imaging system used in the scanner of FIG. 2.

FIG. 4 illustrates a side view an imaging system 300 that may be used in the scanner 200, FIG. 2. The imaging system 300, as viewed from FIG. 4, receives light representing a second positioning area 262 and the scan line portion 366 wherein the scan line portion 366 intersects the second positioning area 262. The left positioning area 262 and the scan line portion 366 are also illustrated from the top view of FIG. 3. The imaging system 300 uses optical techniques to separate the light representing the scan line portion 366 from the light representing the second positioning area 262. This allows the scan line portion 366 to intersect the left positioning portion 262, which in turn, allows the length 242 of the scanner 200 to be approximately the length of the scan line portion 366. Similar optical techniques are used to image light representing a first positioning portion 260, FIG. 3, which is also intersected by the scan line portion 366.

Having summarily described the scanner 200, FIG. 2, and the imaging system 300, FIG. 4, they will now be described in greater detail. Referring to FIG. 2, the scanner 200 may have a front portion 220, a back portion 222, a left portion 224, and a right portion 226. The scanner 200 may have a width 240 extending between the front portion 220 and the back portion 222. The scanner 200 may also have a length 242 extending between the left portion 224 and the right portion 226. The front portion 220, back portion 222, left portion 224, and right portion 226 may define the boundaries of a bottom portion 230, which is also illustrated in FIG. 3. An objective in the design of the scanner 200 is to minimize the width 240 and the length 242 of the scanner 200.

FIG. 4 is a cut away schematic illustration of the optics and imaging devices that may be included in the scanner 200 of FIG. 2 as viewed from the right portion 226 of the scanner 200. The imaging system 300 illustrated in FIG. 4 is depicted generating image data of the surface 212 of the sheet of paper 210 as illustrated in FIGS. 2 and 3. The imaging system 300 may comprise a light source 310, a lens 340, a beam splitter 350, an imaging device 460, and a positioning device 420.

The light source 310 may comprise a first light source 314 and a second light source 316 electrically and mechanically connected to a substrate 312, e.g., a printed circuit board. The first light source 314 may emit light 320 having a first wavelength, e.g., approximately 590 nanometers. The second light source 316 may emit light 322 having a second wavelength, e.g., approximately 875 nanometers. Alternatively, the first light source 314 and the second light source 316 may emit light 320 and 322 having a first band of wavelengths and a second band of wavelengths respectively. The first light source 314 may emit a beam that is appropriately sized to encompass the scan line portion 366 of the surface 212, which is also illustrated in FIG. 3. The second light source 316 may emit a beam that is appropriately sized to encompass the second positioning area 262 and the first positioning area 260, FIG. 3. Alternatively, the second light source 316 may comprise two individual light sources wherein one light source is located in the vicinity of the first positioning area 260 and other light source is located in the vicinity of the second positioning area 262.

The lens 340 may be a gradient index lens array having a positive one magnification as is known in the art. An example of a gradient index lens array is available under the trade name SELFOC through NSG America, Inc. The lens 340 may be located above the scan line portion 366 and the second positioning area 262. The lens 340 may serve to focus light reflected from the scan line portion 366 onto the imaging device 460 and to focus light reflected from the second positioning area 262 onto the positioning device 420 via the beam splitter 350.

The beam splitter 350 may be an optical device that reflects or passes selected wavelengths of light as is known in the art. As will be described in greater detail below, the beam splitter 350 described herein passes the first wavelength of light 320 emitted by the first light source 314 and reflects the second wavelength of light 322 emitted by the second light source 316. The beam splitter 350 may be physically situated within the scanner to reflect the second wavelength of light onto the positioning device 420.

The positioning device 420 may comprise a two-dimensional array 422 of photodetectors 426 electrically and mechanically connected to a substrate 424, e.g., a printed circuit board. The positioning device 420 may have an image side 438 wherein the photodetectors 426 may be electrically and mechanically connected to the image side 438. The two-dimensional array 422 of photodetectors 426 may comprise a plurality of rows 428 of photodetectors 426. The two-dimensional array 422 of photodetectors 426 may have a first row 430 and a last row 432. As will be described in detail below, the positioning device 420 may serve to convert the image of the second positioning area 262 to image data. The imaging system 300 may have another positioning device, not shown in FIG. 4, that is situated to convert an image of the first positioning area 260, FIG. 3, to image data.

The imaging device 460 may comprise a plurality of segments 464 electrically and mechanically connected to a substrate 462, e.g., a printed circuit board. The segments 464 may be arranged on the substrate 462 to form a linear array.

Each segment 464 may have a linear array of photodetectors 470 electrically and mechanically connected thereto. The photodetectors 470 may form a linear array extending along a reference line AA in FIG. 4. The segments 464 may, as an example, be contact image sensors as are known in the art. One example of a commercially available contact image sensor is known as a linear optical array and is available from Texas Instruments, Inc. of Austin, Tex. and sold as model number TSL2301. As will be described in detail below, the imaging device 460 may serve to convert the image of the scan line portion 366 to image data.

Both the positioning device 420 and the imaging device 460 may serve to convert light to image data. Specifically, the photodetectors 426 and 470 may output voltages that are proportional to the intensity of light they receive. For example, photodetectors 426, 470 that receive relatively high intensities of light may output relatively high voltages. Likewise, photodetectors 426, 470 that receive relatively low intensities of light may output relatively low voltages. The image data generated by both the positioning device 420 and the photodetectors 470 may be transmitted to a conventional processor, not shown, for processing.

The photodetectors 470 illustrated in FIG. 4 may be aligned along the reference line AA of FIG. 3, which defines the location of the scan line portion 366. Thus, the location of the scan line portion 366 relative to the surface 212 is governed by the position of the scanner 200 relative to the surface 212. The first positioning area 260 and the second positioning area 262 illustrated in FIG. 3 may be located below the lens 340, FIG. 4. The second positioning area 262 may have a width 268, which may be approximately the same distance between the first row 430 and the last row 432 of photodetectors 426 on the two-dimensional array 422. The second positioning area 262 may also have a length 266 that may be substantially the same as the width 268. The first positioning area 260 may be substantially the same size as second positioning area 262.

Having described the components comprising the imaging system 300, FIG. 4, it will now be described generating image data representing images of the scan line portion 366 and the second positioning area 262 on the surface 212 of the sheet of paper 200.

The light source 310 illuminates the portions of the surface 212 which are to be imaged. Specifically, the first light source 314 illuminates the scan line portion 366 with a first wavelength of light 320, e.g., 590 nanometers. The second light source 316 illuminates the second positioning area 262 with a second wavelength of light 322. Referring briefly to FIG. 3, the first light source 314 illuminates the entire scan line portion 366 and the second light source illuminates the second positioning area 262. A third light source that is similar to the second light source 316, FIG. 4, may illuminate the first positioning area 260.

Referring again to FIG. 4, imaging light 360 reflects from the scan line portion 366 of the surface 212 toward the lens 340. The imaging light 360, thus, has the same wavelength as the first light source 314. The imaging light 360 may be defined as having a left portion 362 and a right portion 364. The imaging light 360 passes through the lens 340 and emerges from the lens 340 as imaging light 370 and is directed toward the beam splitter 350. The imaging light 370 may be defined as having a left portion 372 and a right portion 374. The beam splitter 350 is adapted to pass light having the first wavelength, thus, the imaging light 370 passes through the beam splitter 350 and toward the imaging device 460. The left portion 372 and right portion 374 converge on the photodetectors 470 to focus an image of the scan line portion 366 onto the photodetectors 470. The photodetectors 470 convert an image of the scan line portion 366 to image data in a conventional manner. For example, the image data may be a series of values wherein each value represents the intensity of light received by an individual photodetector 470.

The second positioning portion 262 and the scan line portion 366 are imaged simultaneously. Positioning light 380 reflects from the second positioning area 262 of the surface 212 toward the lens 340. The positioning light 380 has the same wavelength as the light 322 emitted by the second light source 316. The positioning light 380 is defined herein as having a left portion 382 and a right portion 384. The left portion 382 extends between a left point 386 and the lens 340. The right portion 384 extends between a right point 388 and the lens 340. The left point 386 and the right point 388 are separated by the width 268 as illustrated in FIG. 3.

Positioning light 390 emerges from the lens 340 and reflects from the beam splitter 350 toward the positioning device 420. The positioning light 390, prior to intersecting the beam splitter 350, is defined herein as having a left portion 392 and a right portion 394. The left portion 392 intersects, and reflects from, the beam splitter 350 at a left point 396. A lower portion 400 of the positioning light 390 reflects from the left point 396 toward the positioning device 420. The right portion 394 of the positioning light 390 intersects, and reflects from, the beam splitter 350 at a right point 398. A top portion 402 of the positioning light 390 reflects from the right point 398 toward the positioning device 420.

The lower portion 400 of the positioning light 390 extends between the left point 396 of the beam splitter 350 and the last row 432 of photodetectors 426 on the two-dimensional array 422. The top portion 402 extends between the right point 398 and the first row 430 of photodetectors 426 on the two-dimensional array 422. Thus, an image of the second positioning area 262 is focused onto the two-dimensional array 422 of photodetectors 426. An image of the first positioning area 260, FIG. 3, may be focused onto a second two-dimensional array of photodetectors in a similar manner.

The positioning device 420 periodically generates image data representative of the second positioning area 262 and outputs the image data to a processor, not shown, in a conventional manner. The processor identifies distinct features in the image data, such as contrasts created by pulp material that may be used to manufacture the sheet of paper 200. As the scanning device is moved relative to the surface 212, the positions of the distinct features relative to the two-dimensional array 422 move accordingly. When the distinct features have moved a predetermined distance relative to the two-dimensional array 422, the processor receives image data representing a new scan line portion 366 of the surface 212 from the imaging device 460. The processor only receives image data from the imaging device 460 when the scanner has moved a predetermined distance from the previous location where image data was generated. Otherwise, image data would constantly be generated, which may overload the data storage device or substantially increase the time required to process the image data.

Referring to FIG. 3, the scanner 200 may be moved in a direction 218 relative to the surface 212 and across the text 216. As the scanner 200 is moved relative to the surface 212, the imaging system 300, FIG. 4, continually monitors the position of the scanner 200. The position of the scanner 200 relative to the surface 212 is monitored from the first positioning area 260 and the second positioning area 262. This allows the scanner 200 to precisely determine its position as the scanner is moved anywhere on the surface 212. For example, if the scanner is moved in any direction other than the direction 218 or if the scanner is rotated, its position relative to the surface 212 can be readily determined.

In the example illustrated in FIG. 3, an image of the text 216 is converted to image data by converting successive scan line portions 366 of the surface 212, including the text 216, to image data. The scanner 200 may, as an example, generate image data representing a scan line portion 366 every time the scanner 200 moves one one-thousandth of an inch relative to either the first positioning area 260 or the second positioning area 262. The locations of the scan line portions 366 relative to each other are stored in a data base or other electronic storage structure. When the image of the surface 212, including the text 216, is replicated, the scanner 200 will know how to arrange the image data representing the scan line portions 366 because their locations relative to each other have been determined.

The imaging system 300 has many benefits. The most notable benefit is that image data for imaging an object and determining the position of the scanner 200 relative to the object is generated from the same locations on the object. Referring to FIG. 2, this allows for the width 240 and length 242 of the scanner 200 to be minimized because the positioning portions 260, 262, FIG. 3, are incorporated into the imaging portion. Minimizing the size of the scanner 200 makes it less cumbersome to operate and improves the portability of the scanner 200.

Another benefit of the imaging system 300 is that the components comprising the scanner 200 may be mounted to fewer substrates. Referring again to FIG. 4, the two-dimensional array 422 and the substrate 424 may be mounted vertically within the scanner. This vertical mounting is achieved because the image of the second positioning area 262 is reflected at a right angle relative to the horizontal surface 212. The other electronic components that are required to operate the scanner 200 may also be mounted to the substrate 424. Thus, the only horizontally positioned substrate required in the scanner 200 is the substrate 462 used to support the segments 464 and the photodetectors 470. This permits the electronic components comprising the scanner 200, other than the segments 464, to be mounted to the single substrate 424, thereby further minimizing the width 240, FIG. 2, of the scanner 200.

The imaging system 300 illustrated in FIG. 4 illustrates a vertically mounted positioning system 420 and a horizontally mounted imaging device 460. It is to be understood that the positioning system 420 may be mounted horizontally and the imaging device 460 may be mounted vertically, thus, essentially exchanging the locations of the positioning system 420 and the imaging device 460 as illustrated in FIG. 4.

Figure 5:
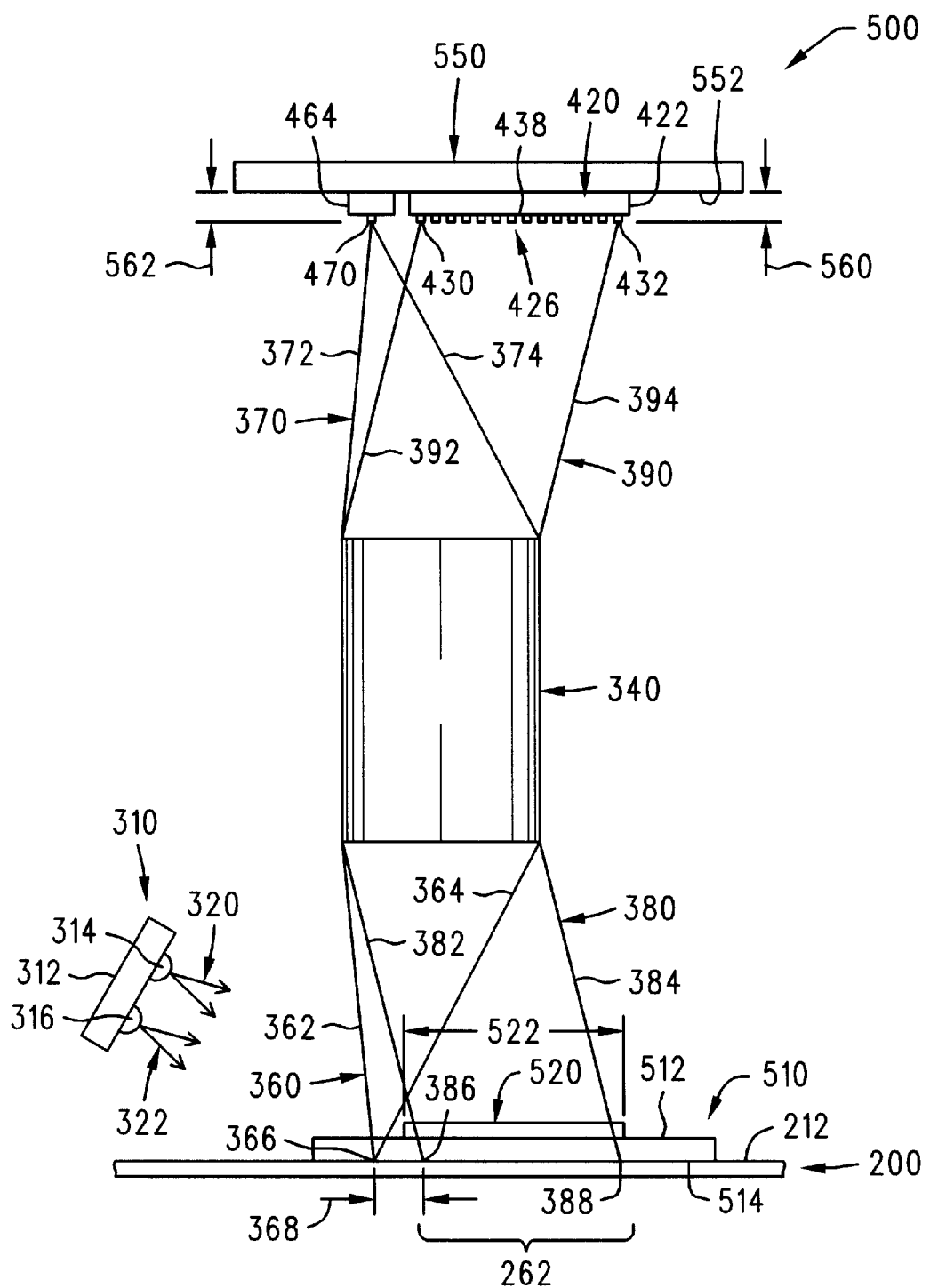
FIG. 5 is an embodiment of an imaging system that may be incorporated into the scanner of FIG. 2.

Another embodiment of an imaging system is illustrated in FIG. 5 and depicted numerically as 500. In summary, the imaging system 500 has the positioning system 420 located in close proximity to the imaging device 460. The positioning light 390 is separated from the imaging light 370 by diffraction from the lens 340 rather than by refraction from a beam splitter or other reflective device. The scan line portion 366 and the second positioning area 262 remain in close proximity to each other, which keeps the width 240, FIG. 2, of the scanner 200 minimized.

Having summarily described the imaging system 500, it will now be described in greater detail. The imaging system 500 is substantially similar to the imaging system 300 of FIG. 4. The primary differences between the imaging systems are that the imaging system 500 does not have a beam splitter 350, FIG. 4, and the positioning device 420 and the imaging device 460 are mounted to a single horizontal substrate 550, e.g., a printed circuit board.

The imaging system 500 may have a plate 510 of transparent material, e.g., glass, located between the lens 340 and the surface 212. The plate 510 in conjunction with a housing, not shown, may serve to keep contaminants from entering the scanner. The plate 510 may have a top surface 512 and a bottom surface 514 wherein the bottom surface 514 faces the surface 212 of the page 200. A second plate of transparent material, referred to herein as the step compensator 520, may be mounted to a portion of the top surface 512 of the plate 510. The step compensator 520 may have a thickness 522. The step compensator 520 may have an index of refraction, n, that is dependent on the frequency of light passing through the step compensator. As will be described below, the step compensator 520 may serve to adjust the field of view of the imaging system 500 so that the positioning light 380, 390 may be precisely focused onto the two-dimensional array 422 of photodetectors 426.

The substrate 550 may be mounted within the scanner so as to be substantially parallel to the plate 510 and, thus, the surface 212. The substrate 550 may have a mounting side 552 that faces in the direction of the plate 510. The imaging device 460 and the two-dimensional array 422 may be electrically and mechanically connected to the mounting side 552 of the substrate 550. The image side 438 of the two-dimensional array 422 may be located a distance 560 from the mounting side 552 of the substrate 550. The photodetectors 470 on the imaging device 460 may be located a distance 562 from the mounting surface 552. The distances 560, 562 are dependent on the longitudinal chromatic aberration of the imaging system 500 as is known in the art. As will be described below, the distances 560, 562 in conjunction with the thickness 522 of the step compensator 520 may be set so as to properly focus the images of the scan line portion 388 and the second positioning area 262 onto the photodetectors 470 and 426 respectively.

The distance 560 and the distance 562 may be related to the thickness 522 of the step compensator 520 by the following equation:

$$H_{560} - H_{562} = \left(\frac{n_{\lambda_2} - 1}{n_{\lambda_2}}\right) t_{522}$$

where:

$H_{560}$ is the distance 560;

$H_{562}$ is the distance 562;

$n_{\lambda 2}$ is the index of refraction of the step compensator 520 for the frequency of the light 322; and $t_{522}$ is the thickness 522.

As illustrated in FIG. 5, the scan line portion 366 and the second positioning area 262 in the imaging system 500 do not intersect as they do with the imaging system 300, FIG. 4. The scan line portion 366 and left point 386 may be separated by a very small distance 368 of approximately 0.5 to 1.0 millimeters. Accordingly, the first light source 314 and the second light source 316 must be aligned so that the imaging light 320 illuminates the scan line portion 366 and the positioning light 322 illuminates the second positioning area 262.

The imaging light 360 and the positioning light 380 are substantially similar to the imaging light 360 and positioning light 380 described in the imaging system 300 of FIG. 4, except that they originate from different portions on the surface 212 of the sheet of paper 200. The imaging light 370 is substantially similar to the imaging light 370 of FIG. 4, except that with the imaging system 500 the imaging light 370 diffracts from the lens 340 toward the photodetectors 470. Likewise, the positioning light 390 diffracts from the lens 340 toward the two-dimensional array 422 rather than reflecting from the beam splitter 350 as illustrated in FIG. 4.

Having described the components comprising the imaging system 500, it will now be described in greater detail generating image data representing images of the scan line portion 366 and the left positioning portion 262. It is to be understood that the right positioning portion 260, FIG. 3, may be imaged in a similar manner, however, for illustration purposes, the first positioning area 260 is not illustrated in FIG. 5.

The lens 340 and other optical components comprising the imaging system 500 may be adapted to operate optimally with a particular wavelength of light. The lens 340 will be described herein as being adapted to operate optimally with the wavelength of imaging light 320 emitted by the first light source 314, e.g., 590 nanometers. Slight optical adjustments may have to be made so that the imaging system 500 may simultaneously operate with the wavelength of the positioning light 322 emitted by the second light source 316, e.g., 875 nanometers. Specifically, corrections are made to adjust the depth of field of the imaging system 500 so that the second positioning area 262 may be precisely focused onto the two-dimensional array 422. These corrections include the addition of the step compensator 520 and varying the distances 560 and 562 as are described below. The imaging system 500 may function without these corrections, however, the image of the second positioning area 262 may not be precisely focused onto the two-dimensional array 422.

The imaging light 320 is emitted by the first light source 314 toward the scan line portion 366 of the surface 212 so as to illuminate the scan line portion 366. The positioning light 322 is emitted by the second light source 316 toward the second positioning area 262 so as to illuminate the second positioning area 262. The imaging light 320, positioning light 322, imaging light 360, and positioning light 380 are substantially similar to those illustrated in FIG. 4 except that the imaging light 360 may not intersect the positioning light 380 at the surface 212.

The imaging light 360 reflects from the scan line portion 366 toward the lens 340. The imaging light 360 may intersect the lens 340 at a slight angle, which, as described below, may cause the imaging light 370 to diffract slightly toward the imaging device 460. Likewise, the positioning light 380 reflects from the second positioning area 262 and may intersect the lens 340 at a slight angle. Accordingly, the positioning light 390 may diffract slightly from the lens 340 toward the positioning system 420.

The imaging light 370 emerges from the lens 340 in a similar manner as was illustrated in the imaging system 300 of FIG. 4. The imaging light 370 in the imaging system 500, however, diffracts slightly to intersect the photodetectors 470 on the imaging device 460. The positioning light 390 emerges from the lens 340 in a similar manner as was illustrated in the imaging system 300 of FIG. 4. The positioning light 390 of FIG. 5, however, diffracts from the lens 340 and is focused directly onto the two-dimensional array 422 rather than being reflected by the beam splitter 350 illustrated in FIG. 4.

In order to precisely focus the image of the second positioning area 262 onto the two-dimensional array 422 slight optical adjustments to the imaging system 500 may have to be made. The imaging system 500 of FIG. 5 has a step compensator 520 located on the top side 512 of the plate 510, which, combined with the distances 560, 562, is used to place the second positioning area 262 in the field of view of the two-dimensional array 422. The addition of the step compensator 520 and variations to the distances 560, 562 may be required because the lens 340 is typically adapted to operate with the first wavelength of light 320, which is the wavelength used to image the scan line portion 366. The second wavelength of light 322 used to image the second positioning area 262 may place the second positioning area 262 out of the depth of field of the lens 340 if the photodetectors 426 were located at the same distance from the substrate as the photodetectors 470. Accordingly, the step compensator 520 is used in conjunction with the distance 560 to locate the second positioning area 262 in the depth of field of the photodetectors 470. Specifically, the step compensator is used to assure that the image of the second positioning area 262 is focused onto the photodetectors 470.

Generating image data and position data with the imaging system 500 is performed in the same manner as described with the imaging system 300 of FIG. 4. The width 240, FIG. 2, of the scanner 200 remains relatively small because the imaging device 460 and the positioning system 420 are in close proximity to each other on the substrate 550.

The imaging system 500 has many benefits over the prior art. The scan line portion 366 and the second positioning area 262 are located in close proximity to each other on the surface 212. For example, they may be separated by only 0.5 millimeters. Thus, referring to FIG. 2, the width 240 of the scanner 200 may be substantially reduced over prior scanners. Additionally, the images of the scan line portion 366 and the second positioning area 262 are focused through the same lens 340, which reduces the optics required by the scanner.

In some embodiments of the imaging system 500, the scan line portion 366 and the second positioning area 262 may intersect at the surface 212. In these situations, the imaging light 370 and the positioning light 390 may be filtered prior to intersecting the photodetectors 426, 470. For example, the photodetectors 470 may be coated with a dichoric coating that functions to pass light in the wavelength of the imaging light 320. Likewise, the two-dimensional array 422 of photodetectors 426 may be coated with a dichoric coating that functions to pass light in the wavelength of the positioning light 322. The dichoric coating may also be applied to the photodetectors 426, 470 in the imaging system 300 illustrated in FIG. 4.

Several embodiments are applicable to the imaging systems and the scanners that incorporate the imaging systems. In one embodiment, only a single positioning portion is used. In this embodiment, image data is only collected from a single area of the surface being scanned. This embodiment has the advantages of being less costly, however, the position information is not as accurate, especially if the scanner is rotated.

In another embodiment, a single wavelength of light is used to illuminate the scan line portion and the positioning portions of the object. In the imaging system 300 of FIG. 4, the beam splitter 350 may be replaced with a partially reflecting mirror. The mirror reflects a portion of the imaging light 370 and the positioning light 390 onto the positioning system 420. If the mirror only extends the length of the positioning system 420, the imaging device 460 will have areas corresponding to the location of the mirror that receive a disproportionally low intensity of light. This is a result of a portion of the light being reflected toward the positioning system 420. In order to overcome this problem, a processor may scale the image data to properly reflect the actual intensity of light reflected from the corresponding portion of the scan line 366.

The imaging system 300, FIG. 4, and the imaging system 500, FIG. 5, have been described herein as being used in a hand-held scanning device. It is to be understood, however, that they may be used in other applications, such as to determine the position of paper in a facsimile machine.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. An imaging apparatus comprising:
   a first light path extending between a focal axis and a linear imaging device, wherein said first light path intersects a first optical component;
   a second light path extending between a focal plane that is located proximate to said focal axis and a two-dimensional imaging device, wherein said second light path intersects said first optical component; and
   wherein a portion of said first light path intersects a portion of said second light path.

2. The apparatus of claim 1 wherein said focal axis intersects said focal plane.

3. The apparatus of claim 1 further comprising:
   a light source operatively associated with said focal axis and said focal plane; and
   a third light path extending between said light source and a location that includes said focal axis and said focal plane.

4. The apparatus of claim 1 wherein said linear imaging device comprises a linear array of photodetector elements.

5. The apparatus of claim 1 wherein said two-dimensional imaging device comprises a two-dimensional array of photodetector elements.

6. The apparatus of claim 1 wherein said first optical component is a partial refraction device, wherein said first light path passes through said partial refraction device, and wherein said second light path refracts from said partial refraction device.

7. The apparatus of claim 1 wherein said first optical component is a partial refraction device, wherein said second light path passes through said partial refraction device, and wherein said first light path refracts from said partial refraction device.

8. The apparatus of claim 1 further comprising a lens located between said first optical component and a location that includes said focal axis and said focal plane wherein said first light path and said second light path pass through said lens.

9. The apparatus of claim 1:
   wherein said first optical component is a lens; and
   wherein said first light path and said second light path pass through said lens.

10. The apparatus of claim 9 wherein said lens is a gradient index lens array.

11. The apparatus of claim 1 further comprising:
    a first light source adapted to emit a first frequency band of light;
    a third light path extending between said first light source and said focal axis;
    a second light source adapted to emit a second frequency band of light; and
    a forth light path extending between said second light source and said focal plane.

12. The apparatus of claim 11 wherein said linear imaging device is adapted to substantially receive said first frequency band of light and substantially reject said second frequency band of light.

13. The apparatus of claim 11 wherein said two-dimensional imaging device is adapted to substantially receive said second frequency band of light and substantially reject said first frequency band of light.

14. The apparatus of claim 11 wherein said first optical component is a beam splitter.

15. The apparatus of claim 14 wherein in said beam splitter substantially passes said first frequency band of light and substantially reflects said second frequency band of light.

16. The apparatus of claim 14 wherein said beam splitter substantially passes said second frequency band of light and substantially reflects said first frequency band of light.

17. A method of imaging an object comprising:
    illuminating an axis portion of said object;
    illuminating an area portion of said object, wherein said area portion of said object is located proximate to said axis portion of said object;
    directing light reflected from said axis portion of said object to a linear imaging device with a first optical component;
    directing light reflected from said area portion of said object to a two-dimensional imaging device with said first optical component;
    causing relative movement between said object and said first optical component;
    generating first image data of said axis portion of said object with said linear imaging device;
    generating second image data of said area portion of said object with said two-dimensional imaging device;
    performing a first analysis on said second image data to identify features of said object; and
    performing a second analysis on said second image data to determine the locations of said features relative to said two-dimensional imaging device as said object moves relative to said first optical component.

18. The method of claim 17 wherein said illuminating an area portion of said object comprises illuminating an area portion of said object, wherein said axis portion intersects said area portion.

19. The method of claim 17:
    wherein said first optical component is a partial refracting device;
    wherein said directing light reflected from said axis portion of said object comprises passing light reflected from said axis portion of said object through said partial refracting device and to a linear imaging device; and
    wherein said directing light reflected from said area portion of said object comprises directing light reflected from said area portion of said object to said partial refracting device and reflecting said light from said partial refracting device to a two-dimensional imaging device.

20. The method of claim 17:
    wherein said first optical component is a partial refracting device;

wherein said directing light reflected from said axis portion of said object comprises directing light reflected from said axis portion of said object to said partial refracting device and reflecting said light from said partial refracting device to a linear imaging device; and wherein said directing light reflected from said area portion of said object comprises passing light reflected from said area portion of said object through said partial refracting device and to a two-dimensional imaging device.

21. The method of claim 17:

wherein said first optical component is a diffracting device;

wherein said directing light reflected from said axis portion of said object comprises diffracting light reflected from said axis portion of said object to a linear imaging device with said diffracting device; and wherein said directing light reflected from said area portion of said object comprises diffracting light reflected from said area portion of said object to a two-dimensional imaging device with said diffracting device.

22. A method of imaging an object comprising:

illuminating an axis portion of said object with a first frequency band of light;

illuminating an area portion of said object with a second frequency band of light wherein said area portion of said object is proximately located to said axis portion of said object;

directing light reflected from said axis portion of said object to a linear imaging device with a first optical component;

directing light reflected from said area portion of said object to a two-dimensional imaging device with said first optical component;

causing relative movement between said object and said first optical component;

generating first image data of said axis portion of said object with said linear imaging device;

generating second image data of said area portion of said object with said two-dimensional imaging device;

performing a first analysis on said second image data to identify features of said object; and performing a second analysis on said second image data to determine the locations of said features relative to said two-dimensional imaging device as said object moves relative to said first optical component.

23. The method of claim 22 wherein said illuminating an area portion of said object comprises illuminating an area portion of said object with a second frequency band of light wherein said area portion of said object is intersected by said axis portion of said object.

24. The method of claim 22 wherein said linear imaging device is adapted to substantially receive said first frequency band of light and substantially reject said second frequency band of light.

25. The method of claim 22 wherein said two-dimensional imaging device is adapted to substantially receive said second frequency band of light and substantially reject said first frequency band of light.

26. The method of claim 22:

wherein said first optical component is a beam splitter;

wherein said directing light reflected from said axis portion of said object comprises passing light reflected from said axis portion of said object through said beam splitter and to a linear imaging device; and wherein said directing light reflected from said area portion of said object comprises directing light reflected from said area portion of said object to said beam splitter and reflecting said light from said beam splitter to a two-dimensional imaging device.

27. The method of claim 22:

wherein said first optical device is a beam splitter;

wherein said directing light reflected from said axis portion of said object comprises directing light reflected from said axis portion of said object to said beam splitter and reflecting said light from said beam splitter to a linear imaging device;

wherein said directing light reflected from said area portion of said object comprises passing light reflected from said area portion of said object through said beam splitter and to a two-dimensional imaging device.

28. An imaging apparatus comprising:

a first illumination means for illuminating an axis portion of an object;

a second illumination means for illuminating an area portion of said object wherein said area portion of said object is located proximate to said axis portion of said object;

a light directing means for directing light reflected from said axis portion of said object to a linear imaging device and for directing light reflected from said area portion of said object to a two-dimensional imaging device;

a first processing means for processing data generated by said linear imaging device;

a second processing means for identifying and locating features in said area portion of said object.

\* \* \* \* \*